United States Patent

Kim et al.

[11] Patent Number: 5,891,567
[45] Date of Patent: Apr. 6, 1999

[54] POLYESTER FILAMENTARY YARN, POLYESTER TIRE CORD AND PRODUCTION THEREOF

[75] Inventors: Sung-Joong Kim; Gi-Woong Kim; Sang-Min Lee; Duk-Yong Choi, all of Kyungsangbuk-do, Rep. of Korea

[73] Assignee: Kolon Industries, Inc., Seoul, Rep. of Korea

[21] Appl. No.: 894,706

[22] PCT Filed: Dec. 26, 1996

[86] PCT No.: PCT/KR96/00248

§ 371 Date: Aug. 29, 1997

§ 102(e) Date: Aug. 29, 1997

[87] PCT Pub. No.: WO97/24478

PCT Pub. Date: Jul. 10, 1997

[30] Foreign Application Priority Data

Dec. 30, 1995 [KR] Rep. of Korea .................. 1995-69066
Dec. 13, 1996 [KR] Rep. of Korea .................. 1996-64955

[51] Int. Cl.⁶ .................................................. D02G 3/00
[52] U.S. Cl. ............................................ 428/364; 428/395
[58] Field of Search .................................... 428/364, 395; 57/902; 152/451

[56] References Cited

U.S. PATENT DOCUMENTS

| | | | |
|---|---|---|---|
| 4,101,525 | 7/1978 | Davis et al. | 528/309 |
| 4,134,884 | 1/1979 | Frankfort et al. | 528/309 |
| 4,195,052 | 3/1980 | Davis et al. | 264/210.5 |
| 4,491,657 | 1/1985 | Saito et al. | 528/308.1 |
| 5,288,553 | 2/1994 | Collins et al. | 428/364 |
| 5,472,781 | 12/1995 | Kim et al. | 429/364 |
| 5,558,935 | 9/1996 | Tanaka et al. | 428/395 |
| 5,658,665 | 8/1997 | Kim et al. | 428/364 |

FOREIGN PATENT DOCUMENTS 0 042 664 12/1981 European Pat. Off. .
0 546 859 6/1993 European Pat. Off. .

Primary Examiner—Newton Edwards
Attorney, Agent, or Firm—Oblon, Spivak, McClelland, Maier & Neustadt, P.C.

[57] ABSTRACT

A polyester filamentary yarn having a novel internal microstructure, a polyester tire cord produced from the yarn and a process for production thereof are provided. The polyester yarn of the present invention comprising at least 90 mol % polyethylene terephthalate and having a fineness of 3 to 5 denier per filament, wherein said yarn satisfies the following i)~iii) characteristics, after it has been treated for 3 minutes at temperature of 240°0 C., tension of 0.1 g/d, said yarn satisfies the following iv)~vii) variations of microstructural physical properties: i) a density of 1.38~1.39 g/cm³, ii) a birefringence index in amorphous portions of 0.06~0.09, iii) tan δ peak temperature of 140 ° C. and below, iv) the increment of a percent crystallinity ($\Delta X_c$) of 10~20 wt. %, v) the decrement of an amorphous orientation coefficient ($\Delta F_a$) of at least 0.05, vi) the increment of a long period value ($\Delta LP$) of at least 10Å, and vii) the decrement to tan δ peak temperature ($\Delta \tan \delta_{peak}$) of at least 5 ° C. The filamentary yam is dipped in a rubber solution to produce a tire cord which exhibits excellent dimensional stability and fatigue resistance when it has been incorporated in a rubber matrix of a tire.

3 Claims, No Drawings

POLYESTER FILAMENTARY YARN, POLYESTER TIRE CORD AND PRODUCTION THEREOF

BACKGROUND OF THE INVENTION

1. Field of the Invention

The present invention relates to an industrial polyester filamentary yarn and a tire cord formed from this filamentary yarn. More particulary, it relates to a polyester filamentary yarn, a tire cord having an improved fatigue resistance due to increased thermal dimensional stability and strength, and low shrinkage as well as a process for production of this yarn.

2. Description of the Prior Art

In general, nylon, rayon, polyester etc. fibers are typical examples of the fibers which have been used as reinforcements in rubber tires. Nylon tire cord has higher strength and toughness than the other materials due to the inherent properties of nylon fiber and has been generally used in bias tires for trucks, buses etc. Rayon tire cord provides a low degree of shrinkage and has good thermal and dimensional stability due to the inherent properties of rayon fiber and has been generally used in high speed radial travelling tires for passenger cars.

However, nylon tire cord has poor dimensional stability due to its low modulus characteristics and high shrinkage and further exhibits flat spots due to its low glass transition temperature($T_g$). Rayon tire cord also has low modulus characteristics and exhibits a sharp decrease in strength after the fibers have been formed into a tire cord.

In view of these defects found in both nylon and rayon tire cords, polyester tire cord has been widely used.

Prior art polyester fibers that have been used in tires have benzene lings in their molecular structure, and a rigid molecular chain. Accordingly, tire cord formed from polyester yarn has good elastic modulus and good fatigue resistance, and provides few flat spots, excellent creep resistance and excellent endurance. For these reasons, polyester tire cord has been widely used in radial tires for passenger cars.

However, in spite of the above described merits, conventional polyester tire cords do have a problem; they undergo substantial variation in their properties with temperature due, it is thought, to hysteresis effect. In particular, conventional industrial high strength polyester fibers generally exhibit substantial shrinkage when heated.

Also, when industrial polyester fibers have been incorporated into a rubber matrix of a tire, as the tires rotate during use the fiber is stretched and relaxed during each tire rotation. Further, the internal tire air pressure stresses the fiber, and tire rotation while axially loaded or stressed causes repeated stress variations, particularly on unsmooth surface.

Since more energy is consumed during the stretching of a fiber than is recovered during its relaxation, the difference of energy dissipates as heat. This is termed hysteresis or work loss. Significant temperature increases have been observed in rotating tires during use which are attributable at least in part to this fiber hysteresis effect.

The variation in properties caused by heat generation occurs due to moisture and amines contained in conventional rubber solutions used in rubber treatments for producing tire cord, and the observed variation tends to be increased when the content of carboxyl end group is high, leading to a significant lowering of strength and fatigue resistance.

In recent years, as radial tires having high performance have been widely developed and used, the demand for polyester tire cord with superior properties, especially properties superior to those obtained with nylon or rayon tire cord, has been increasing. Therefore, research into development of a polyester tire cord having improved fatigue resistance by minimizing the heat generated due to the hysteresis effect has been undertaken.

Prior art methods for improving fatigue resistance of polyester fibers have focused on a chemical method for increasing stability by reducing the content of carboxyl groups in the polyester and a method wherein highly-oriented undrawn yarn produced using a polyester with a relatively low intrinsic viscosity(IV), or produced by employing a high-speed spinning process, is drawn.

Reference directed towards increased chemical stability are Japanese patent laid-open nos. Sho. 54-132696 and 54-132697 which disclose the inhibition of deterioration due to thermal decomposition resulting from heat generation by reducing the content of carboxyl end groups. Reducing the content of carboxyl end groups via copolymerization with or melt-blending in an aliphatic polyester has a advantage in that the increased mobility of amorphous portions effects a reduction in heat generation leading to a reduction in thermal degradation which effects improved fatigue resistance. But in this method, high crystalline polyester fiber can not be obtained and the tenacity and initial elastic modulus of the material is always low. Thus, the shrinkage of the resulting fiber is increased and the product obtained is not a high quality tire cord yarn. Also, reducing the content of end groups by adding a blocking agent has a disadvantage in that the degree of polymerization is lowered and the cost is increased.

References directed to a method of increasing thermal stability are U.S. Pat. Nos. 4,101,525 and 4,195,052 which disclose an improvement in fatigue resistance by increasing the mobility of the molecular chains in the amorphous portions using high-speed spinning. In this process, the fatigue resistance is improved but the amorphous molecular chain length is irregular and long, and the relaxed molecular chains coexist so that the loss of tenacity is high. Also, the difference in properties between the inner and outer layers of fiber is effected so that the drawability decreases. The resultant variation in physical properties within these portions of the fiber is severe due to the presence of a defective microstructure.

Prior art processes for producing tire cord from yarn include, for example, Japanese patent laid-open no. Sho 61-12952 which discloses a tire cord having a tenacity of at least 7.0 g/d, an absorption peak temperature in the amorphous portions of 148°–154° C., a dry shrinkage of 3.3–5% which is produced by spinning a polyester having an intrinsic viscosity of 1.0, a diethylene glycol content of 1.0 mol %, a carboxyl group content of 10 eq/$10^6$ g at a spinning speed of 2,000–2,500 m/min to obtain undrawn yarn, drawing the undrawn yarn at about 160° C., thermally treating at 210°–240° C. and dipping the obtained yarn in a conventional rubber solution.

In addition, U.S. Pat. Nos. 4,101,525 and 4,195,052 disclose a polyester tire cord produced by a process comprising drawing highly oriented undrawn yarn prepared from a high-speed spinning process to obtain highly oriented drawn yarn, specifically multi-drawn yarn comprising 85 mol % polyethylene terephthalate having a denier per filament of 1 to 20 and a work loss at 150° C. of 0.004–0.02 lb.in, and dipping the multi-drawn yarn in a rubber solution.

In the above methods, the tie molecular chains, which greatly affect dimensional stability (especially shrinkage), are oriented. This leads to residual internal stress and finally causes a lowering of the fatigue resistance of the tire cord. In most of the conventional polyester yarns for tire cord, internal stress causes a temperature rise which induces a continuous increase of thermal stress. This finally results in poor tire cord fitigue resistance because after the tire cord conversion process or dipping process comprising dipping the cord in a rubber solution and thermally treating, an internal stress remains in the tire cord.

Moreover, yarns which are highly oriented drawn yarns before undergoing the tire cord conversion process have a definite two-phase structure with both crystalline and amorphous portions. When it is dipped in a rubber solution and thermally treated, breaking of molecular chains occurs and leads to a lowering of strength.

In addition, Japanese Patent laid-open no. Sho. 54-77794 discloses a process which comprises treating polyester drawn yarn with an epoxy resin compound prior to dipping in a rubber solution but this process did not solve the above-described problems.

The present invention has been developed to solve the above described problems of the prior art. According to the present invention, the two problems of lowering of fatigue resistance due to residual internal stress by high-speed spinning and lowering of strength due to deterioration of the crystalline portions on dipping in a rubber solution can be solved based upon the points described below.

Polyester yarn having a high crystallinity undergoes a high degree of the thermal hysteresis and, accordingly, has a high thermal stress. Thus, it tends to undergo a lowering of strength, elastic modulus or strength retension efficiency due to formation of folded crystals and in particular, from unconstrained molecular chains in the amorphous portions present during recrystallization which subsqunet heat treatments, such as dipping process etc., cause.

In addition, a high crystalline polyester yarn itself may exhibit microstructally good thermal stability, dimensional stability and fatigue resistance, but these properties are still insufficient because the -yarn has not any functional groups for bonding with rubber. Accordingly, the yarn is twisted to improve its fatigue resistance and is subjected to dipping process(latex treatment) to improve bonding property with the rubber. All conditions of thermal energy, shrinkage and relaxation heat treatment etc. in dipping process of the yarn determine the mechanical properties and final dimensional stability of tire cords. From such variation, the present inventors have found that a microstructural variation during a series of cord conversion processes is a important technical point in improvement of cord qualities such as dimensional stability and fatigue resistance.

The present inventors have directed their research toward improving the prior art methods for producing polyester yarn for tire cord which has excellent overall physical properties like strength, and at the same time, which has a high strength conversion efficiency and excellent dimensional stability leading to excellent fatigue resistance when used even after having been subjected to a high temperature dipping treatment as well as after having been incorporated into a rubber matrix. As a result of this research, the present invention has been achieved.

Thus, in order to improve the mechanical properties and thermal shrinkage of filamentary yarn, most of the conventional methods form filamentary yarn with an ideal structure which maintain high degree of crystallization and minimize the degree of orientation of amorphous portions, through processes taking with the thermal treatment of high temperature, and dip the filamentary yarn into a rubber solution to accomplish properties required as final tire cords.

But, the high temperature processes accompanied in such methods is causative of increasing remaining thermal stress, limitation to the high speed production of filaments and a rise in cost due to an increase in required energy. Also, thermal energy required in dipping process have to be higher than energy required in the preparation of filamentary yarn to relax thermal stress accumulated in the preparation of filamentary yarn so that the dipping speed is restricted. Also, such methods restrict microstructual variations in dipping process, and therefore, are unfavorable to accomplish the mechanical properties and dimensional stability of cords.

The present invention comprise producing a polyester tire cord having stable two-phase structure of crystalline and amorphous portions by defining a density, which represents a crystallization level, within a limited range from the preparation of yarn, maximizing birefringence index of amorphous portions to form fibrous microstructure and then recrystallization using thermal energy generated during dipping in rubber solution to rearrange the fibrous microstructure.

Amorphous portions with high degree of orientation existing in filamentary yarn is easily crystallized when they are subjected to thermal treatment during dipping. The size of such crystal in the present yarn is small than that of conventional yarn with 10% or more. Accordingly, the present filamentary yarn in a cord has a network crystal structure which crystalline portions and amorphous portions are homogeneously distributed, and therefore, have a excellent dimensional stability. In particular, the content of constrained tie molecular chains connecting between crystals is increased by minimizing formation of folded crystals during recrystallization so that high elastic modulus can be remained.

Moreover, the present inventors have discovered particular spinning and drawing process which achieve the above characteristics. Consquently, the process conditions necessary to produce an excellent polyester filamentary yam have been designed. In more detail, an undrawn yarn is produced which has highly oriented molecular chains in amorphous phase shch that crystalline diffraction is not observed clearly by x-ray, thereafter the undrawn yarn is drawn at a low draw ratio and a low temperature (below the crystallization temperature) so as to minimize the strain of molecular chains in amorphous portions induced by drawing, and then subjected to thermal treatment and relaxing at a low temperature so that no further crystallization occurs. The filamentary yarn is then dipped into a rubber solution and thermally treated at certain temperature and tension conditions enabling recrystallization to occur, thereby obtaining a final polyester tire cord.

OBJECTS OF THE INVENTION

The first object of the present invention is to provide a polyester filamentary yarn which exhibits excellent fatigue resistance and dimensional stability both before and after it has been incorporated in a rubber matrix even under the conditions where it is subjected to repeated fatigue behavior at high temperature (at least 210° C.), and a process for production thereof.

The second object of the present invention is to provide a tire cord comprising a polyester filamentary yarn exhibiting excellent dimensional stability and fatigue resistance useful as a reinforcement in rubber.

The third object of the present invention is to provide a tire exhibiting significantly improved fatigue resistance and dimensional stability even under the conditions of repeated fatigue behavior at high temperature.

In order to achieve the above objects, the present invention provides a polyester filamentary yarn comprising at least 90 mol % polyethylene terephthalate and having a fineness of 3 to 5 denier per filament, wherein said yarn satisfies the following characteristics:

i) a density of 1.38~1.39 g/cm$^3$, ii) a birefringence index in amorphous portions of 0.06~0.09, and iii) tan δ peak temperature of 140° C. and below.

Said yarn after it has been treated for 3 minute at temperature of 240° C., tension of 0.1 g/d satisfies the following variations of microstructural physical properties:

i) the increment of an percent crystallinity($\Delta X_c$) of 10~20 wt %, ii) the decrement of an amorphous orientation coefficient ($\Delta F_a$) of at least 0.05, iii) the increment of a long period value($\Delta LP$) of at least 10 Å, and iv) the decrement of tan δ peak temperature($\Delta \tan \delta_{peak}$) of at least 5° C.

The long period value may be calculated from the Bragg equation by obtaining the small angle X-ray scattering pattern under the conditions of 50 kV voltage, 200 mA current employing X-ray scattering instrument (the inventors used an instrument manufactured by Rigaku Co., Ltd. of Japan), using Cu-K α-radiation with 1.54 Å wavelength as a light source.

$$d=/2\theta \quad \text{(Bragg equation)}$$

where

λ=1.54 Å

θ=scattering angle

When a polyester filamentary yarn comprising at least 90 mol % polyethylene terephthalate is treated at a dipping condition which a relaxation and tension is subjected to filaments at high temperature, namely, a tension of 0.2~0.6 g/d, a heating zone temperation in relaxing and dipping of 230°~250° C., microstructural variations occurs in filaments during converting the filamentary yarn into the treated cord. Such microstructural variations are same with the microstructural variations before and after the filamentary yarn has been treated for 3 minute at temperature of 240° C., tension of 0.1 g/d.

Preferably, the present polyester filamentary yarn exhibits a considerable decrease of thermal shrinkage between the yarn and its treated cord according to variations of microstructural physical properties on dipping process. When a polyester filamentary yarn satisfies above characteristics, the filamentary yarn after dipping process has an ideal microscopic structure.

Also, the present invention provides a process for producing a polyester filamentary yarn from polyester resin comprising at least 90 mol % polyethylene terephthalate and having an intrinsic viscosity of at least 0.85 by melt-spinning and directly drawing, wherein i) said polyester resin is spun at a spinning speed of 2,500~4,000 m/min and then solidified by quenching at a quench air temperature of 25° C.~$T_g$ of the polymer to an extent of a solidification point formed within ⅔ of the whole length of a quenching zone and below to produce a undrawn yarn having a density of 1.355~1.360 g/cm$^3$;

ii) said undrawn yarn is drawn at a drawing temperature of $T_g$ to crystallization temperature of the polymer to produce a drawn yarn having a breaking elongation of 15% and below; and iii) the obtained drawn yarn is thermally set at a temperature of 210° C. and below.

According to the present process, a polyester undrawn yarn having a density of 1.355~1.360 g/cm$^3$ can be drawn at a drawing temperature between glsss transition temperature (i.e. second transition temperature) and crystallization temperature of the polymer and preferably 80°–120° C., and then thermally treated at a temperature of 210° C. and below to produce a drawn yarn having a breaking elongation of 15% and below.

Also, the present invention provides a tire cord formed from a polyester filamentary yarn comprising at least 90 mol % polyethylene terephthalate and having a fineness of 3 to 5 denier per filament, wherein said cord satisfies the following characteristics according to variations of microstructural physical properties on dipping:

i) a value of dimensional stability(DS): DS≧0.80, ii) tenacity of cord [T(g/d)]: T≧0.1DS+4.8, and iii) a dry shrinkage of 3.5% and below.

The polyester filamentary yarn of the present invention contains at least 90 mol % polyethylene terephthalate, preferably at least 95 mol % Additionally, the polyester filamentary yarn of the present invention may contains 10 mol % and below, preferably 5 mol % and below, copolymerized ester units other than polyethylene terephthalate. The ester-forming ingredients useful as ester units other than polyethylene terephthalate include, for example, glycols such as diethylene glycol, trimethylene glycol, tetramethylene glycol, hexamethylene glycol and dicarboxylic acids such as isophthalic acid, hexahydroterephthalic acid, adipic acid, sebasic acid, azellaic acid, etc.

The polyester filamentary yarn of the present invention usually has a fineness of 3–5 denier per filament, but this value can be widely varied as is apparent to the skilled in this art.

According to the present invention, in order to forcilate the microstructural conversion of a polyester filamentary yarn and increase its conversion rate, a density, which represents a crystallization level, is limited within a given range from the preparation of yarn and a birefringence index of amorphous portions is maximized. As a result of such microstructural limitation, the peak intensity of the yarn in x-ray diffraction is minimized. Then, the fibrous microstructure of the yarn is rearranged through a recrystallization using thermal energy generated during dipping process in rubber solution to produce a polyester tire cord having stable two-phase structure of crystalline and amorphous portions.

The microstructue of the yarn as specifically defined in the present invention may be determined by scanning x-ray diffraction strength within a small angle in the direction of the meridian and quantitatively computing the strength of diffraction lines. Also, the density(ρ) may be determined by measurement according to density gradient column method using n-heptane and carbon tetrachloride at 25° C.

The present yarn is characterized by a density of 1.38~1.39 g/cm$^3$. When the density of the yarn is below the above range, the filament is so soft that breakage frequently occurs during the yarn manufacturing process. On the contrary, when the density of the yarn is beyond above range, the yarn, as it is subjected to high heat during the yarn manufacturing process etc., has a high residual thermal stress which causes a lowering of the strength of cord and limits variations of its microstructure during dipping process although the mechanical properties of the yarn may be good and the thermal shrinkage of the yarn is lowering.

Additionally, the present yarn is characterized by a birefringence of amorphous portions($\Delta n_a$) of 0.06~0.09, preferably 0.07~0.09. The pressent yarn exhibits a suitable orientation characteristic of amorphous portions within the above range of $\Delta n_a$. When the $\Delta n_a$ is out of the above range, the degree of orientation in amorphous portions is insufficient so that on dipping the amount of the amorphous portions incorporated into the crystalline portions is low and the increased thermal energy required for increasing the amount of incorporation may be effected thereby to produce a final dipped cord with poor properties such as low strength and poor dimensional stability.

The birefringence of amorphous portions($\Delta n_a$) may be calculated from the following equation.

$$\Delta n_a = (\Delta n - 0.212 X_c f_c)(1 - X_c)$$

where $\Delta n$: average birefringence of fiber $X_c$: crystallinity, $f_c$: crystalline orientation coefficient The average birefringence($\Delta n$) is calculated from the following equation by measuring the retardation obtained from the interference fringe by the sample using a Berek compensator mounted in a polarizing light microscope.

$$\Delta n = \frac{R}{d}$$

where d: thickness of sample (mm), R: retardation (nm)

The crystallinity($X_c$) may be calculated from the following equation using the density($\rho$, unit: g/cm$^3$) of the fiber $$X_c = \frac{(\rho - \rho_a)}{(\rho_c - \rho_a)}$$

where $\rho_c$(g/cm$^3$): 1.455

$\rho_a$(g/cm$^3$): 1.335

The crystalline orientation coefficient($f_c$) may be calculated from the following equation by averaging the orientation coefficients obtained from the width at half-height of the wide angle x-ray diffraction pattern of (010) and (100) crystal planes of the material.

$$f_c = \frac{f(010) + f(100)}{2}$$

When the density of yarn and the briefringence of amorphous portions($\Delta n_a$) is out of the above range, the crystalline and amorphous portions are clearly defined so that a decrease in strength due to the undesirable growth of crystals and formation of folded chains on the surface of crystal may be effected thereby to produce a final dipped cord with poor properties.

Besides these facts, the present inventors have discovered that the following fact is more important factors in producing a reforcing fiber for rubbers such as tires.

A reinforcing fiber for rubbers such as that used in tires under fatigue behavior, including repeated stretching, compression and flexing, is required to have improved toughness and high dimensional stability because it tends to suffer a severe lowering of strength and elastic modulus. In order to achieve these characteristic, the crystalline portions of materials should be uniformly distributed in the yarn. The shrinkage phenomenon, which is an important indicator of dimensional stability, is a phenomenon observed when molecular chains are subjected to heat: the length of the molecular chains is shortened as the molecular orientation of amorphous portions becomes loose and disordered. The part which contributes to a decrease in the dimensional deformation is the crystals adjacent to the amorphous portions. If such crystals form a close network structure, the variation of an elastic modulus under high temperature, which is represented by the value of tan δ peak temperature, acts to prevent the dimensional deformation such as shrinkage by heat. In other words, This yields the same effect as that of forming a crosslink network in a rubber using sulfur.

Thus, enhancing dimensional stability has been limited to a certain extent without the improvement of tan δ peak temperature. The present yarn has lower tan a peak temperature than that of conventional yarn. The tan δ peak temperature of the prsent yarn is 140° C. and below, preferably 135° C. and below.

In addition, another factor to limit the stress isolation present in the methods to isolate stress employing a relaxing process is that even if the degree of orientation is lowered as in U.S. Pat. No. 4,101,525 and U.S. Pat. No. 4,195,052, the constraint of the amorphous molecular chains cannot be sufficiently released owing to the folded molecular chains on the crystal surface and a high amount of defects on the crystal interface, and it is not easy to obtain high elastic properties due to the decrease of the proportion of tie molecules.

As mentioned above, according to the present polyester filamentary yarn, the accumulation of stress due to heat etc., is minimized, and the following microstructual variations between the filamentary yarn and the treated cord occur simultaneously by the help of thermal energy, tension, etc., on dipping:

i) the increment of an percent crystallinity($\Delta X_c$) of 10~20 wt %, ii) the decrement of an amorphous orientation coefficient ($\Delta F_a$) of at least 0.05, iii) the increment of a long period value($\Delta LP$) of at least 10 Å, and iv) the decrement of tan δ peak temperature($\Delta \tan \delta_{peak}$) of at least 5° C.

Therefore, the present invention provides a polyester filamentary yarn exhibiting the remarkable decrease of thermal shrinkage by minimizing the accumulation of stress by heat etc. in the yarn and causing simultaneously the above described microstructural variation of physical properties between the yarn and the dipped cord using thermal energy on dipping and mechanical forces such as tension. The present yarn having such characteristics make the production of a cord having a good mechanical properties and dimensional stability possible.

Amorphous portions with high degree of orientation existing in a filamentary yarn is further crystallized when they are subjected to thermal treatment during dipping. The size of such crystal in the present yarn is smaller than that of conventional yarn with 10% or more. Accordingly, the present filamentary yarn in a cord has a network crystal structure which crystalline portions and amorphous portions are uniformly distributed, and therefore, have a excellent dimensional stability. In particular, the content of constrained tie molecular chains connecting between crystals is increased by minimizing formation of folded crystals during recrystallization so that high elastic modulus can be remained.

Consequently, the present yarn itself exhibits a high shrinkage in an oven at 150° C. during 30 minutes under zero tension, but a cord prepared by dipping the yarn into a rubber matrix exhibits the following excellent physical properties owing to the above described microstructural variations:

i) a value of dimensional stability(DS): $DS \geq 0.80$,
ii) tenacity of cord [T(g/d)]: $T \geq 0.1DS+4.8$, and
iii) dry shrinkage of cord(%)$\leq 3.5\%$.

It is generally known that a tire cord having a network structure as described above generates a lot of heat, when it has been incorporated in a tire and subjected to deformation power such as elongation and compression, because a high activation energy is required for the molecular chains existing in the amorphous portions to move, and, as a result, the interior temperature of tire will be increased and accordingly the tire cord will have poor fatigue resistance and a short lifetime, But in practice the opposite phenomenon is observed The present inventors have verified by experiments that the above described network contributes to excellent fatigue resistance. This is because the fatigue mechanism of tire cord is attributed to the chemical deterioration much more than to physical deterioration.

From "Research for Deterioration of Polyester Tire Cord in Tire" in Journal of Japanese Rubber Associates, 1991, Vol. 64, p-260–266, it is known that about 80 percent of the deterioration due to fatigue is caused by the hydrolysis and aminolysis of ester bonds in the polyester molecular chains and the remainder is caused by physical deformation.

If a tire cord in tire has a structure wherein a network developed well, movement of the amorphous molecules by exterior elongation, compression and flexing deformation is difficult so that a high amount of heat is generated to increase the temperature and thus to increase the physical fatigue, but it is very small. On the contrary, the present yarn has a high degree of orientation in the amorphous portions which makes the penetration of water and amines difficult, thereby decreasing the chemical deterioration to obtain excellent fatigue resistance.

Now, a process for the production of the present filamentary yarn will be described in detail.

The polyester used as the starting material may be a polyester with a high polymerization degree shch that its intrinsic viscosity is at least 0.85. The intrinsic viscosity($\eta$) may be calculated from the following equation by determining the relative viscosity($\eta_r$) of a solution of 8 g of sample in 100 ml of ortho-chlorophenol at 25° C. using an Ostwald viscometer.

$$\eta = 0.242\eta_r + 0.2634$$

$$\text{where } \eta_r = \frac{t \times d}{t_0 \times d_0}$$

where
t=dropping time of solution (sec)
$t_o$=dropping time of ortho-chlorophenol (sec)
d=density of solution (g/cm$^3$)
$d_0$=density of ortho-chlorophenol (g/cm$^3$)

The degree of polymerization is very important with respect to ultimate dimensional stability and fatigue resistance. In particular, a polymer with a low molecular weight may be used advantageously for dimensional stability, but a polymer with a high molecular weight is preferred for fatigue resistance. In the present invention, optimization of the whole of the properties and a lowering of fatigue resistance can be achived by selecting a polymer with an intrinsic viscosity of at least 0.85, preferably at least 1.0.

A high-stress spinning process is performed to obtain an undrawn yarn with a density of at least 1.355 g/cm$^3$, It is important to produce the undrawn yarn exhibiting unique packing degree of molecular chains in the prior step before producing the yarn forming the above described microstructure according to the present invention.

When the density is less than 1.355 g/cm$^3$, an excessive drawing is required in the drawing process to get a sufficient strength and modulus of elasticity for rubber reinforcing fiber. The excessive drawing tension yields high residual stress leading to a high crystallization by the orientation of the yarn. Accordingly, the structural variation of a final dipped cord cannot be controlled.

The density of the undrawn yarn is proportional to the magnitude of tension which the extruded yarn is subjected to upon reaching the glass transition temperature by cooling with quench air. The magnitude of tension depends upon the spinning speed, the discharge quantity per opening and the temperature of the quench air. In general, the density of the undrawn yarn is effected on the point that the extruded yarn from the spinneret reaches a temperature below the glass transition temperature by cooling with quench air. In the present invention, the density is preferably controlled to be at least 1.355 with a high tension in the solidification point by heightening the spinning speed to increase the speed of tensile deformation of the extruded yarn or by fixing the spinning speed and decreasing the discharge quantity per opening. At this time, to heighten the tension in the solidification point, it is advantageous that the bundle of filaments is slowly cooled so that the solidification point moves as fat as possible from the spinneret. Particularly, when the the bundle of filaments is cooled after melt spinning from the spinneret, it is preferable to form the solidification point within $\frac{2}{3}$ of the whole length of the quenching zone and below.

The density of undrawn yarn is variable according to positions forming the solidification point. Accordingly, positions forming the solidification point can presuppose from the density of undrawn yarn.

The lowering of strength owing to the temperature difference between the inner and outer layer of the filament can be decreased by increasing the quench temperature to a range of from 25° C. to the glass transition temperature $T_g$ of the polymer, preferably 40°~60° C. in order to decrease the temperature difference between the inner and outer layer of the filament at the solidification point in a high-speed spinning process. When the temperature is less than 25° C., the filament may be too quickly quenched and thus the tension at the solidification point may be decreased so that it may be difficult to obtain a highly oriented undrawn yarn.

Varying the discharge quantity per opening may have a great influence upon the mechanical properties of the yarn. It is advantageous to maintain the finess of the yarn after drawing within 3 to 5 denier by controlling the spinning conditions and preventing a ununiform quench.

The present process is characterized by drawing at a low draw ratio and at a temperature below the crystallization temperature of the undrawn yarn. Multi-step drawing of two or more step is preferably used in the present process. The crystallization temperature of a highly oriented undrawn yarn produced by a high-speed spinning process is usually lower by more than 10° C. than that of an undrawn yarn by a low-speed spinning process. Thus, the drawing temperature is controlled to be in the range of from the glass transition temperature to 120° C., preferably 80°~120° C., more preferably 80°~90° C.

If the drawing temperature is high, fine crystals are already formed before the orientation of the molecular chains and accordingly the drawability is degraded. At low temperature, the molecular chains lose their mobility, whereby the efficiency of drawing is low.

The total draw ratio is controlled to be in the range of about 1.4:1~2.2:1, preferably 1.4:1~1.8:1. When this ratio is less than 1.4:1, the fiber attains insufficient strength and in the case exceeding 2.2:1, high modulus values and low shrinkage cannot be achived and the percentage of lowering of strength may be high.

The reason why multi-step drawing comprising two or more step is preferably used in the present process is as follows: if the drawing is performed in one step by drawing to achieve about 70 percent of total draw ratio in the first drawing zone, the period of time taken is not enough for the tangled molecular chains to attain a fibrillar structure so that part of the molecular chains remain in the tangled state. This causes a defect of structure and, accordingly, shrinkage by heat may be increased.

According to the present invention, the shrinkage of the dipped cord can be greatly decreased by use of a highly oriented undrawn yarn produced by the high-speed spinning process such that it is transformed into a liquid-like form rather than undergoes shrinkage when it is subjected to heat after drawing it under specific conditions.

It is reported that as a result of experiments wherein the initially oriented amorphous polymer was maintained at a temperature between the glass transition temperature and melting temperature and then its behaviour under the stress was observed, it is proved that shrinkage is originated from the disorientation of molecular chains in the oriented amorphous portions and transformation to liquid-like form by elongation occurs as the degree of orientation increase when a stress higher than the shrinkage power is applied. Therefore, the elongation and shrinkage behaviour upon application of heat can be considered to be a phenomenon oriented from the difference of elongation power due to crystallization of the originated amorphous molecular chains.

Accordingly, in the present invention, the mechanism of elongation and shrinkage behaviour is put to use so the the shrinkage can be minimized.

The present inventors have found that in order to maximize the elongation behaviour like a liquid, crystallization by heat should not occur during drawing. Accordingly, the drawing should be carried out at a low draw ratio and at a temperature below the crystallization temperature of the undrawn yarn. That is to say, when crystallization by heat already has occurred in the drawing process, because the oriented amorphous portions have been transformed into a crystalline portions, the elongation transformation occurring as the oriented amorphous portions are changed to oriented crystals no longer occurs. The shrinkage behaviour only occurs by disorientation of the amorphous molecular chains existing in the amorphous portions, which leads to a high dry shrinkage value.

The present process is characterized in that the thermal treatment of the resulting drawn yarn is carried out at a temperature of 150°~210° C., preferably 190°~200° C.

When the temperature exceeds 210° C., the crystalline and amorphous portions may be previously defined in the yarn. Accordingly, the orientation of the crystalline portions are extremely increased and the orientation of the amorphous portions are decreased. Therefore, lowering of physical properties due to abnormal crystal growth in the subsequent dipping process can not be minimized. The temperature is one of the important factors to determine the structure of the yarn because in this thermal treatment a yarn with nearly completed orientation is treated. The temperature is required to be in the range of 150°~210° C., preferably 190°~200° C. to produce the present polyester yarn for tire cord.

In general, the undrawn yam before drawing will gain the characteristic properties of the final yarn as it undergoes a drawing process wherein the crystallization and orientation of molecular chains occur by the heat employed in drawing. The orientation in drawing occurs concurrently in the crystalline and amorphous portions, and drawing tension of the amorphous portions are higher than the crystalline portions. Thus, when a yarn for tire cord having such a microstructure is subjected to twisting or to a dipping process to be formed into a tire cord, the mechanical properties of the yarn are often seriously degraded.

In the present invention, this problem is solved by controlling the temperature at which the amorphous molecular chains after drawing initiate mobilization, that is, the loss tangent value(tan δ) is at a maximum. For example, this problem is solved by controlling the tan δ peak temperature with 140° C. and below and lowering at least 5° C. during dipping process.

The present yarn is subjected in sequence to dipping in a rubber solution, drying, thermal treatment and normalizing thereby to produce a tire cord. In a hot stretch thermal treatment during said dipping process, a tension in the range of 0.2~0.6 g/d and a temperature in the range of 220°~250° C. is suitably employed. If the tension exceeds 0.6 g/d or the temperature exceeds 250° C., a stress much higher than the elongation power originated from the crystallization of the oriented amorphous molecular chains may be applied against the yarn and then it may remains as a residual stress finally in the dipped cord, leading to an increase in dry shrinkage.

When the tension is less than 0.2 g/d, the shrinkage may be decreased but the strength is lowered due to the undisirable growth of the amorphous molecular chains owing to disorientation and folding of the chains. And if the temperature is less than 220° C., the adhesion of the rubber solution may be insufficient, the shrinkage may increase and, further, it may be impossible to obtain a tire cord with a high crystallinity.

The present filaments are twisted in more than two strand on the basis of 1,000 denier and formed into a fabric, then this fabric is dipped into a conventional rubber solution and dried. Subsequently, the fabric is thermally treated at the above described temperature and tension, and normalized to obtain a cord fabric, from which the dipped cord of the present invention is obtained. The thus obtained dipped cord exhibit a dry shrinkage(S) of at most 3.5%. Also, the present tire cord exhibits a value of dimensional stability(DS) of at least 0.80, wherein DS value means dry shrinkage(S) divided by tenacity(g/d) at 10% elongation.

Now, the present invention will be described in more detail by the Examples and Comparative examples which are illustrative only and are not intended to limit the scope of the invention.

EXAMPLE 1.1~1.7 AND COMPARATIVE EXAMPLE 1~10

A polyethylene terephthalate polymer having an intrinsic viscosity of 1.0 and a carboxyl end group content of about 15 eq./$10^6$ g was used as a starting material. The polymer was melt-spun at 305° C. In the melt spinning, a spinneret containing 250 holes (hole diameter 0.60 mm) was used in the extrusion. A shroud was placed directly under the spinneret and below the shroud quenching and solidification was carried out with quench air at a temperature less than 80° C.

The other process conditions employed to produce the polyester filamentary yarns are described in Table 1-1 and 1-2 which follow. The properties of the obtained yarns are described in Table 2-1 and 2-2 which follow. Also, the properties after a thermal treatment of the yarns at 240° C. under a tension of 0.1 g/d for 3 minutes are described in Table 3-1 and 3-2 which follow.

The test of the properties appearing in Table 2-1 ~3-2 were performed according to the following methods:

tenacity and elongation: in accordance with JIS-L1017 method
  instrument: low-speed elongation type tensile strength tester from Instron Co., Ltd.,
  tensile speed: 300 mm/min, length of sample: 250 mm, atmospheric conditions: 25° C., 65% RH dry shrinkage of yarn: the value($\Delta\delta$, in percent) calculated from the following equation wherein $L_0$ is the length of a sample measured under a load of 20 g after it has been placed at 25° C., 65% RH during more that 24 hours, and $L_1$ is the length after it has been placed in the oven at 150° C. during 30 minutes under zero load.

$$\Delta\delta(\%) = \frac{L_0 - L_1}{L_0} \times 100$$

dry shrinkage of cord: the value (S, in percent) calculated from the following equation wherein $l_0$ is the length of the cord fabric measured under a dead weight loading of 20 g after it has been placed at 25° C., 65% RH during more that 24 hours, and $l_1$ is the length after it has been placed in the oven at 150° C. during 30 minutes under a dead weight loading of 20 g.

$$S(\%) = \frac{l_0 - l_1}{l_0} \times 100$$

percentage of retained strength of cord: in accordance with ASTM D 885 method. The value obtained from the following formula by measuring the strength of a cord sample taken from a tire, before and after 48 hours rotation at an inner tube pressure of 3.5 kg/cm³, rotation speed 850 rpm and tube angle 80°.

$$\text{percentage of retained strength}(\%) = \frac{\text{strengh after testing}}{\text{strengh before testing}} \times 100$$

peak intensity small angle x-ray diffraction (cps):
  instrument: X-ray scattering instrument from Rigaku Co., Ltd. of Japan.
  light source: Cu-K α-radiation, voltage: 50 kV, current: 180 mA tan δ peak temperature: the value measured under the condition of 100 Hz, temperature rise rate of 3° C./min.

TABLE 1-1

| | Examples | | | | | | |
|---|---|---|---|---|---|---|---|
| Parameters | 1.1 | 1.2 | 1.3 | 1.4 | 1.5 | 1.6 | 1.7 |
| temp. of quench air (°C.) | 40 | 25 | 60 | 40 | 40 | 40 | 50 |
| spinning speed (m/min) | 3300 | 3500 | 3100 | 3300 | 2700 | 2900 | 3600 |
| density of undrawn yarn (g/cm³) | 1.355 | 1.358 | 1.360 | 1.360 | 1.355 | 1.357 | 1.365 |

TABLE 1-1-continued

| | Examples | | | | | | |
|---|---|---|---|---|---|---|---|
| Parameters | 1.1 | 1.2 | 1.3 | 1.4 | 1.5 | 1.6 | 1.7 |
| temp. of 1st draw zone (°C.) | 90 | 100 | 80 | 80 | 90 | 80 | 90 |
| temp. of 2nd draw zone (°C.) | 90 | 100 | 90 | 90 | 90 | 90 | 90 |
| temp. of heat treatment (°C.) | 200 | 210 | 200 | 190 | 190 | 200 | 190 |
| relax ratio (%) | 2.0 | 2.0 | 2.0 | 2.0 | 2.0 | 2.0 | 2.0 |
| total draw ratio (times) | 1.75 | 1.60 | 1.76 | 1.79 | 1.74 | 1.68 | 1.58 |

TABLE 1-2

| | Comparative examples | | | | | |
|---|---|---|---|---|---|---|
| Parameters | 1.1 | 1.2 | 1.3 | 1.4 | 1.5 | 1.6 |
| temp. of quench air (°C.) | 25 | 25 | 25 | 40 | 25 | 40 |
| spinning speed (m/min) | 1800 | 1800 | 2500 | 3000 | 600 | 3050 |
| density of undrawn yarn (g/cm³) | 1.346 | 1.346 | 1.348 | 1.354 | 1.342 | 1.354 |
| temp. of 1st draw zone (°C.) | 90 | 90 | 90 | 100 | 110 | 110 |
| temp. of 2nd draw zone (°C.) | 100 | 100 | 100 | 130 | 130 | 220 |
| temp. of heat treatment (°C.) | 220 | 245 | 220 | 240 | 220 | 190 |
| relax ratio (%) | 2.0 | 2.0 | 2.0 | 2.0 | 2.0 | 2.0 |
| total draw ratio (times) | 2.22 | 2.22 | 2.17 | 1.72 | 5.26 | 1.58 |

TABLE 2-1

| | Examples | | | | | | |
|---|---|---|---|---|---|---|---|
| Properties | 1.1 | 1.2 | 1.3 | 1.4 | 1.5 | 1.6 | 1.7 |
| breaking elongation (%) | 14.6 | 15.0 | 13.2 | 12.1 | 13.5 | 14.2 | 15.0 |
| density (g/cm³) | 1.389 | 1.390 | 1.384 | 1.389 | 1.381 | 1.385 | 1.389 |
| birefringence of amorphous portions | 0.065 | 0.060 | 0.075 | 0.069 | 0.080 | 0.078 | 0.060 |
| peak intensity in small angle x-ray diffracton (cps) | 330 | 390 | 400 | 420 | 483 | 408 | 275 |
| crystallinity (%) | 43.8 | 44.6 | 39.7 | 43.8 | 37.2 | 40.5 | 43.8 |
| amorphous orientation coefficient | 0.71 | 0.67 | 0.66 | 0.70 | 0.73 | 0.75 | 0.66 |
| long period (Å) | 129 | 127 | 130 | 129 | 132 | 130 | 125 |
| tanδ peak temp. (°C.) | 132 | 131 | 133 | 131 | 135 | 133 | 130 |

TABLE 2-2

| | Comparative examples | | | | | |
|---|---|---|---|---|---|---|
| Properties | 1.1 | 1.2 | 1.3 | 1.4 | 1.5 | 1.6 |
| breaking elongation (%) | 11.0 | 12.1 | 13.4 | 15.1 | 14.0 | 16.2 |
| density (g/cm³) | 1.393 | 1.399 | 1.396 | 1.397 | 1.395 | 1.392 |
| birefringence of amorphous portions | 0.050 | 0.045 | 0.052 | 0.049 | 0.055 | 0.059 |
| peak intensity in small angle x-ray diffraction (cps) | 1030 | 1250 | 570 | 980 | 780 | 590 |
| crystallinity (%) | 47.1 | 52.0 | 49.6 | 50.4 | 48.7 | 455 |
| amorphous orientation coefficient | 0.630 | 0.612 | 0.650 | 0.600 | 0.663 | 0.650 |
| long period (Å) | 155 | 159 | 145 | 149 | 156 | 140 |
| tanδ peak temp. (°C.) | 149 | 155 | 145 | 140 ↓ | 152 | 140 ↓ |

TABLE 3-1

| Properties | Examples | | | | | | |
|---|---|---|---|---|---|---|---|
| | 1.1 | 1.2 | 1.3 | 1.4 | 1.5 | 1.6 | 1.7 |
| crystallinity (%) | 56 | 55 | 53 | 54 | 51 | 55 | 53 |
| | (+12.2) | (+10.4) | (+13.3) | (+10.2) | (+13.8) | (+14.5) | (+9.2) |
| amorphous orientation coefficient | 0.59 | 0.58 | 0.06 | 0.68 | 0.55 | 0.55 | 0.55 |
| | (0.12) | (−0.09) | (−0.06) | (−0.10) | (0.18) | (0.2) | (0.11) |
| long period (Å) | 140 | 141 | 142 | 142 | 145 | 140 | 140 |
| | (+11) | (+14) | (+8) | (+43) | (+13) | (+10) | (+15) |
| tan δ peak temp. | 124 | 120 | 125 | 122 | 130 | 128 | 120 |
| | (−8) | (−11) | (−8) | (−9) | (−5) | (−5) | (−10) |

TABLE 3-2

| Properties | Comparative examples | | | | | |
|---|---|---|---|---|---|---|
| | 1.1 | 1.2 | 1.3 | 1.4 | 1.5 | 1.6 |
| crystallinity (%) | 55 | 57 | 55 | 56.3 | 54.7 | 53.9 |
| | (+7.9) | (+5) | (+5.4) | (+5.9) | (+6) | (+8.4) |
| amorphous orientation coefficient | 0.623 | 0.610 | 0.605 | 0.578 | 0.650 | 0.585 |
| | (−0.007) | (−0.002) | (−0.045) | (−0.022) | (−0.013) | (−0.065) |
| long period (Å) | 162 | 165 | 150 | 153 | 165 | 147 |
| | (+7) | (+6) | (+5) | (+4) | (+9) | (+7) |
| tan δ peak temp. | 140 | 141 | 139 | 138 | 140 | 138 |
| | (−9) | (−14) | (−6) | (−3) | (−12) | (−3) |

EXAMPLE 2.1~2.7

The drawn filamentary yarn produced in the above Examples was subjected to twisting consisting of first twists of 49 times/10 cm in Z direction and second twists of 49 times/10 cm in S direction and two times of doubling and then formed into a fabric. The resulting fabric was dipped in resorcinol formalin latex solution and then dried at 160° C. during 60 seconds.

Thereafter, the dipped fabric was thermally treated, relaxed at 1.5 percent, and normalized at 245° C. for 60 seconds, to finally obtain a polyester tire cord of 2500 denier. The properties of the so obtained tire cord are also described in Table 4 which follows.

TABLE 4

| | Examples | | | | | | |
|---|---|---|---|---|---|---|---|
| | 2.1 | 2.2 | 2.3 | 2.4 | 2.5 | 2.6 | 2.7 |
| example no. of the used yarn | 1.1 | 1.2 | 1.3 | 1.4 | 1.5 | 1.6 | 1.7 |
| tenacity (g/d) | 6.1 | 5.3 | 6.0 | 6.1 | 6.3 | 6.1 | 5.2 |
| coefficient of dimensional stability (DS) | 0.94 | 1.06 | 0.94 | 0.90 | 0.82 | 0.90 | 1.14 |
| dry shrinkage (%) | 2.2 | 2.2 | 2.3 | 2.3 | 2.5 | 2.3 | 2.0 |
| tenacity(g/d) at 10% elongation | 2.06 | 2.33 | 2.16 | 2.06 | 2.04 | 2.06 | 2.28 |

From the result in Table 4, it can be seen that the present tire cord has a dry shrinkage less than 3.5% at dimensional stability(DS) of at least 0.80 and thus exhibits excellent dimensional stability.

Though the present invention has been described by the preferred embodiments, it is understood that the variation and modification apparent to the skilled in this art is possible. Such variation and modification should be considered to be included within the sprit and scope of the present claims which follow.

We claim:

1. A polyester filamentary yarn comprising at least 90 mol % polyethylene terephthalate and having a fineness of 3 to 5 denier per filament, wherein after said yarn has been treated for 3 minutes at temperature of 240° C., tension of 0.1 g/d, it satisfies the following i)–iv) variations of microstructural physical properties:

i) the increment of a percent crystallinity ($\Delta X_c$) of 10–20 wt %, ii) the decrement of an amorphous orientation coefficient ($\Delta F_a$) of at least 0.05, iii) the increment of a long period value ($\Delta LP$) of at least 10 Å, and iv) the decrement of tan δ peak temperature ($\Delta \tan \delta_{peak}$) of at least 5° C.

2. A tire cord formed from a polyester filamentary yarn according to claim 1 comprising at least 90 mol % polyethylene terephthalate and having a fineness of 3 to 5 denier per filament, wherein said cord satisfies the following characteristics according to variations of microstructural physical properties on dipping:

i) a value of dimensional stability(DS): $DS \geq 0.80$, ii) tenacity of cord [T(g/d)]: $T \geq 0.1DS + 4.8$, and iii) dry shrinkage of cord $\leq 3.5\%$.

3. A tire comprising a rubber matrix and the polyester tire cord defined in claim 2 imbedded in the rubber matrix.

* * * * *